United States Patent Office 2,787,205
Patented Apr. 2, 1957

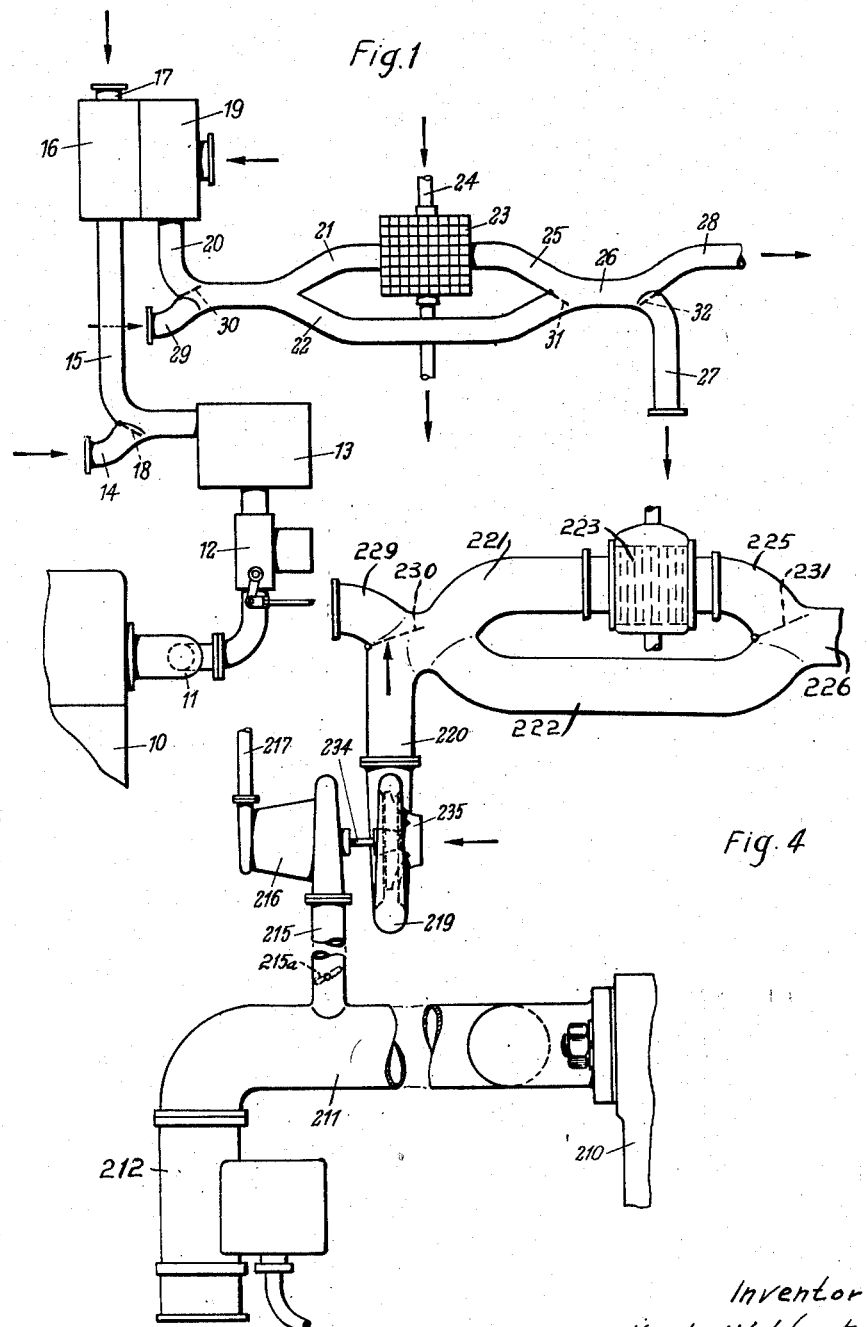

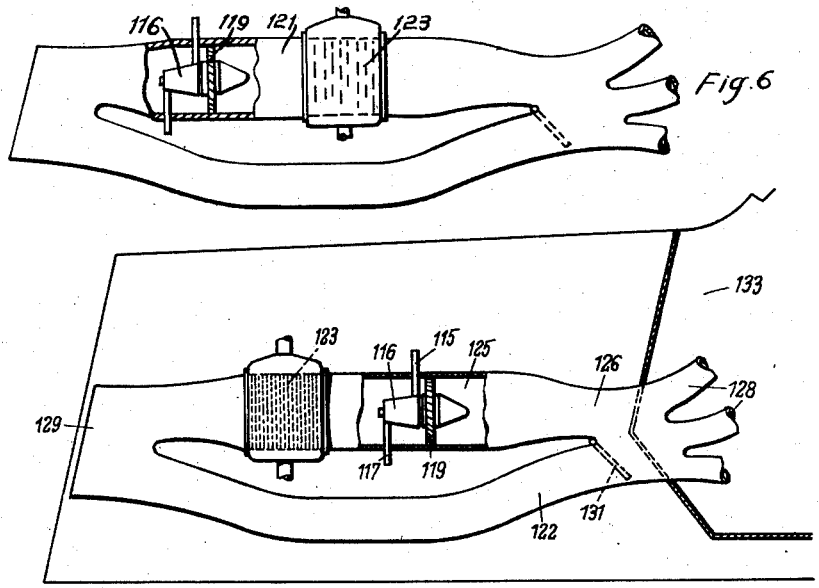
Fig. 6
Fig. 2
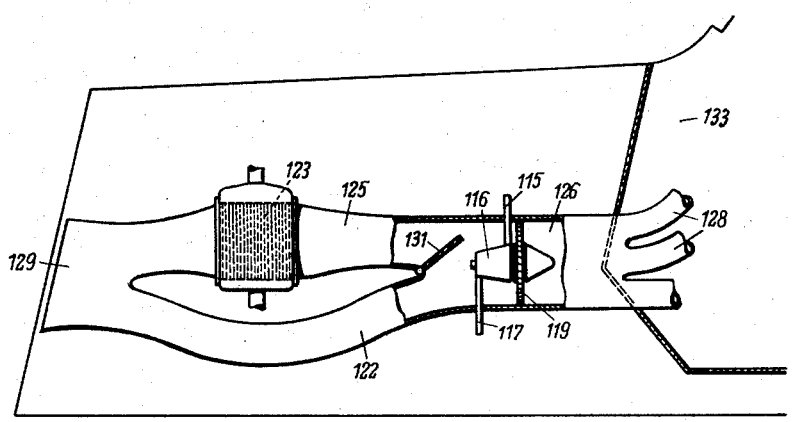
Fig. 3
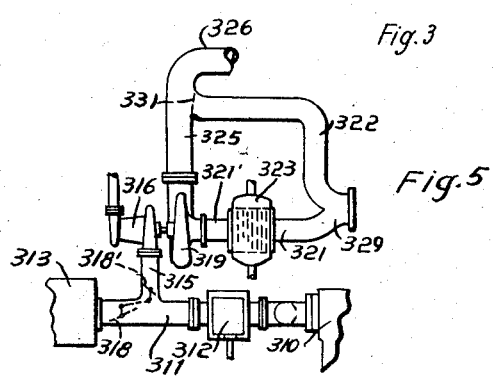
Fig. 5

2,787,205

DEVICE FOR HEATING AND VENTILATION, PARTICULARLY OF MOTOR VEHICLES

Karl Wilfert, Stuttgart-Degerloch, Germany, assignor to Daimler-Benz Aktiengesellschaft, Stuttgart-Unterturkheim, Germany Application March 15, 1951, Serial No. 215,815
In Germany June 10, 1949

Public Law 619, August 23, 1954
Patent expires June 10, 1969

7 Claims. (Cl. 98—2)

The present invention relates to a device for an improved heating and ventilating system, particularly for motor vehicles.

It is an object of the present invention to achieve a particularly effective heating and ventilation with relatively simple means.

In accordance therewith a characteristic of the present invention consists of such a heating and ventilation system, in which a blower, which conveys the air, is driven by an indraft device or suction motor, for example by a suction turbine, which acts as a driving motor for the blower and is driven by the depression or vacuum which exists, for example, in the intake manifold of a combustion engine.

A further object of the present invention is the provision of a heating and ventilating system which remains effective also when the induced draft or suction, which drives the indraft device, becomes so small, for example, as a result of a small depression or vacuum in the suction or intake manifold of the combustion engine producing the induced draft, that sufficient effectiveness of delivery with respect to the heating and ventilating air can no longer be assured.

Accordingly, a further characteristic of the present invention resides in the fact that in addition to an air supply by the blower, which is driven by the indraft device, provision is made for a further air supply, particularly as effected directly by the movement of air which takes place during motion of the vehicle.

Another feature of the present invention consists in that air drawn in by a blower as well as air received by an inlet line arranged ahead of the heat exchanger which inlet line is openly exposed to the direction of travel of the vehicle so as to catch fresh air during movement of the vehicle, are fed selectively into the vehicle interior. This enables, on the one hand, a fresh air heating and ventilation of the vehicle interior, and, on the other, requires that the suction turbine be rated for operation only during the presence of a relatively high depression or vacuum in the intake manifold of the engine when the same is idling or only slightly loaded. It also obviates the need for regulation or requires only limited regulation of the blower within narrow limits by a change in the admission of air to the turbine, whereas with greater vehicle speeds, during the presence of lesser vacuum in the intake manifold of the engine corresponding to the greater loading thereof, the turbine with the blower may be turned off completely, and the fresh air admission may be effected in sufficient measure solely by the dynamic pressure of the air produced by movement of the vehicle.

The fresh air which is drawn in by the blower and which is received by the fresh air inlet line is suitably fed to the interior of the vehicle by means of a common line containing the heat exchanger. In order to decrease or completely eliminate the heating effect of the heat exchanger a branch or by-pass line by-passing the heat exchanger may be provided in parallel with at least a portion of the common line. Shifting members may be provided so as to selectively connect or disconnect the various lines at their respective junction points.

Further objects of the invention relate to a simple and suitable regulating arrangement of the heating effect, to a suitable assemblage of the suction indraft driving device or motor with the blower driven thereby, which assemblage saves space and work, and further to an arrangement of the turbine-blower aggregate, which distinguishes itself by ease of installation and relatively high efficiency.

In accordance therewith and in conformity with a further feature of the present invention, particularly the turbine-blower aggregate is arranged within the cross-sectional confines of a portion of the fresh air line, which leads to the interior space of the vehicle.

A further object of the present invention is the provision of an improved efficiency on the indraft device, particularly of turbines, by a special dimensioning of the inlet and outlet lines or conduits thereof. As a rule the cross sections of these lines or conduits are made of equal or essentially equal dimensions.

However, according to a further characteristic of the present invention, the efficiency of the indraft device can be improved considerably at no additional expense or impairment of the suction efficiency, for example, on the part of the combustion engine, by the fact that the cross section of the outlet line or conduit is dimensioned considerably larger than that of the inlet line or conduit of the indraft device. A cross section ratio of at least 1:10, the most favorable of about 1:16, i. e., with circular cross-sections of the conduits or lines, a diameter ratio of about 1:4 between inlet and outlet conduit of the indraft device, have proven particularly advantageous.

Further objects, features and details of the present invention will become more obvious from the following description of several embodiments in accordance with the present invention when taken in connection with the accompanying drawing which shows, for purposes of illustration only, several embodiments in accordance with the present invention, and wherein:

Figure 1 is a schematic view of a first embodiment of a heating and ventilating arrangement in accordance with the present invention.

Figures 2 and 3 are modifications of the arrangement shown in Figure 1 as regards the location of the turbine-blower aggregate.

Figure 4 is a schematic view of another embodiment in accordance with the present invention showing an indraft driving device arranged in a branch line of the main suction line or intake manifold of the engine.

Figure 5 is a still further modification of a heating and ventilating arrangement in accordance with the present invention, and Figure 6 is a modification, similar to Figures 2 and 3, showing another arrangement of the turbine-blower aggregate with respect to the heat exchanger.

With systems of the prior art only a re-circulated air heating system was possible, while no fresh air heating and no ventilation of the vehicle interior was provided with the heating system turned off, especially as no adequate steps were taken to equalize or compensate for the decrease in the output of the suction turbine driving the blower with decrease in vacuum in the intake manifold of the internal combustion engine when operating under loads.

Devices by means of which the rotational speed of the blower could be regulated within certain limits by throttling the air supply of the turbine driving the blower were known with prior art systems. As, however, the air drawn in through the turbine creates a side effect in the suction line of the internal combustion engines, i. e., has an effect on the air drawn in through the remainder of the suction line or intake manifold of the internal combustion engines due to variation in the amount of air flowing therethrough and due to possible changes in the flow pattern of the air in the suction line or intake manifold of the internal combustion engines the control or regulation of the blower speed by arbitrarily changing the amount of air causing these side effects, influences the combustion mixture in the suction line of the internal combustion engine, especially during idling of the engine, in a very unfavorable manner. Besides, it is practically impossible to make the suction turbine physically large enough to provide a sufficiently large output by simply opening the throttling device controlling the air admission to the turbine when the vacuum in the intake manifold of the combustion engine during relatively large loading thereof almost completely disappears.

In Figure 1, a carburetor 12 is operatively connected ahead of suction line or inlet manifold 11 of the internal combustion engine 10, for example, of the engine driving a vehicle, and an air filter 13 is operatively connected ahead of the carburetor 12. The outside air enters the air filter 13 either through a fresh air inlet connecting member or line 14, which is opened at one end thereof to the outside fresh air, or through a suction line or conduit 15, in which an indraft motor or driving device, for example, a turbine 16 is located, which is driven by the indraft created by the vacuum existing in the intake manifold 11 of the combustion engine, and to which air flows through an inlet connecting member or line 17, connected at one end with turbine 16 and exposed to the fresh air at the other open end. A shifting or adjustable closing member 18, for example, an adjustable flap, is arranged at the junction of the two suction lines or conduits 14 and 15, which is operative to connect either the one or the other line 14 or 15 to the air filter 13. The shifting member 18 may be optionally shifted by the driver or may be shifted automatically in any suitable manner.

A blower or ventilator 19 is driven by the indraft device 16. A delivery line or conduit 20 is supplied with fresh air by the output of the blower 19, to which the air is applied in an optional manner, for example, axially or tangentially. The line 20 branches off into a line or conduit 21 and a line or conduit 22. A heat exchanger 23 is arranged in the line 21, to which, for example, heated cooling water is fed as at 24. The air, which is heated in the heat exchanger 23, flows off through a line or conduit 25. The lines 21 and 25, through which flows the air to be heated, constitute the warm-air or heating line of the system, while the line 22 through which only cold or unheated air passes, constitutes the cold-air line. The lines or conduits 22 and 25 combine to form a common mixing line or conduit 26, from which the air may flow through the exhaust line or conduit 27, for example, into the open air or through the line or conduit 28 into the interior of the vehicle body or to a heating device (not shown) for the interior of the car. Nozzles for defrosting the windshield or similar heating and ventilating arrangements, for example, may also be suitably connected to the line 28.

Furthermore, line 20 and therewith the lines 21 and 22 may be connected directly with the outside air either through a fresh air inlet line or conduit connecting member 29, which by-passes the blower 19, particularly in such a manner that the air currents produced by relative movement of the vehicle may enter the conduit 29 as unimpeded as possible. An adjustable shifting member 30 may thereby alternately connect the lines 21 and 22 either with the line 20 and the blower 19 or with the line 29. The actuation of the shifting member 30 may be effected in any suitable manner, for example, in the same manner as the actuation of the shifting member 18.

At the junction of the lines or conduits 25 and 22 a further shifting member 31 is provided, which may be shifted, for example, by the driver or also automatically, for example, depending on the temperature existing in the interior of the car. In the position of the shifting members 31 indicated in full lines, the entire air, which is supplied by the blower 19 or through inlet line 29, is conveyed through conduit 21, the heat exchanger 23 and conduit 25 so that a relatively great heating effect is achieved. If the heating effect is to be diminished or the interior of the car is to be aired, the shifting element 31 is moved partially or entirely into the position thereof shown in dashed lines. Instead of regulating or controlling the heating effect by means of the shifting element 31, a regulation of the heating effect may also be achieved by regulating the heat exchanger 23, or the cooling water afflux to the latter, by regulating the drive of the blower 19, by adjusting the shifting elements 18 or 30, or in another suitable manner. The by-pass line 22 may thereby be omitted.

In order to enable conduction of the heated air optionally either into the open air or into the car body or to the heating device or the like, provision may be made for a further shifting member 32 located at the junction of lines 27 and 28 so as to optionally connect line 26 either with line 27 or line 28.

In the embodiments according to Figures 2 and 3 in which corresponding elements are designated by corresponding reference numerals of the one hundred series, reference numeral 129 designates the fresh air inlet line for the admission of fresh air at the foremost end of the vehicle, 123 a heat exchanger operated, for example, by the exhaust gases or by the cooling water of the vehicle driving engine, 125 the warm-air or heating line, which leads from the heat exchanger 123 to the interior of the vehicle, and 122 a cold-air branch line, in parallel with line 125 and by-passing the heat exchanger 123. The cold air line 122 joins or recombines with the line 125 at 126 to form a common mixing line or conduit.

The fresh air supply to the interior space 133 of the vehicle may be regulated by a flap or shifting member 131 in such a manner that either only cold air or only warm air or a mixture of both may reach the interior space 133.

The outlet connecting members or conduits 128 make possible the conveyance of fresh or heated air to different places in the interior space 133 of the vehicle, for example, to the windshield, under the individual seats, etc.

While driving the vehicle the fresh air is conveyed in general into the interior space 133 of the vehicle by the dynamic pressure, which occurs at the open end of the inlet opening 129 as a result of movement of the vehicle. However, in order to have an intensive airing or heating of the interior space 133, provision is made for a blower 119, which is driven by an indraft device or motor, for example, by an air turbine 116, the outlet line or conduit 115 of which is connected with the intake manifold of the driving engine of the vehicle (not shown) so that the combustion air sucked in by the latter must make its way entirely or partially through the turbine 116, into which the air enters through the line or conduit 117 in order to impinge on the impeller wheel thereof.

In accordance with the present invention the fresh air blower 119, which is formed as an axial blower, is arranged together with the air turbine 116 within the cross sectional confines of a line forming part of the fresh air line system, i. e., in Figure 2 within the warm air or heating line 125, and in Figure 3 within the mixing line 126.

Instead of being mounted behind the heat exchanger 123, as shown in Figure 2, the blower and turbine aggregate may also be mounted ahead of the same, as shown in Figure 6.

In the embodiment according to Figure 4, in which corresponding elements are designated by corresponding reference numerals of the two hundred series, the outlet line or conduit 215 of a suction indraft turbine 216 is connected to the suction line or intake manifold 211 of a combustion engine 210, which serves for driving the motor vehicle. The connection of the line 215 to the line 211 is suitably arranged behind an air filter, which is arranged at the free end of the line 211, and, if so desired, behind a carburetor 212 for the fuel of the combustion engine 210, which carburetor 212 is arranged within the line 211. Provision may be made in the lines 211 and 215 for shifting members or adjustable regulating flaps or the like, in order to be able to regulate the number of revolutions of the turbine 216, i. e., the speed thereof, or to turn it off completely. Thus the turbine 216 can be placed out of operation, for example, by closing a butterfly valve 215' in line 215.

During the operation of the combustion engine 210 with the turbine 216 turned on, air is continuously drawn into line 211 through the turbine casing and through the line 215. The rarefaction of the air which takes place thereby causes a flow of outside air through the inlet line 217 to the same extent, and thereby drives the impeller of the turbine.

Furthermore, the cross section of the outlet line 215 of the turbine is chosen considerably larger than that of the inlet line 217. The ratio of the cross sections between the inlet line 217 of the outlet line 215 is in the illustrated embodiment about 1:16, i. e., the ratio of the diameter of both pipes is about 1:4, so that a diameter of the outlet pipe of 8–10 mm. would correspond to a diameter of the inlet nozzle of 2–2.5 mm.

A blower 219 is driven by the shaft 234 of the indraft turbine 216, which sucks in outside air at 235 and conveys the latter into the interior space of the vehicle through the delivery line 220, in order to convey enough fresh air for heating and ventilation purposes to the interior space also during standstill of the vehicle or when driving the same relatively slowly.

The arrangement of the blower in the heating arrangement may be optional.

Similar to the arrangement according to Figure 1, the delivery line or conduit 220 of the blower 219 is connected at its upper end to the junction of lines or conduits 221 and 222 which branch off thereat. A heat exchanger 223 is connected to the line 221, and a line 225, which conducts the warm air heated by the heat exchanger 223, recombines the warm air lines system with the cold air line 222 to form a common mixing line 226. A shifting member or adjustable control flap 231 is provided at the junction of lines 225 and 222 to controllably regulate the distribution of the air to the cold air line 222 and the warm air or heating line system 221 and 225.

The line 220 is further connected with a fresh air inlet connecting line or member 229, which provides free unimpeded admission for the outside air from in front of the vehicle when the relative movement of the vehicle produces dynamic pressure thereby forcing some outside air into the conduit 229 through the open end thereof. A shifting member or control flap 230 may adjustably regulate the admission to the heating and ventilating system through either the blower 219 or the inlet line 229.

Figure 5 shows a further modification, similar to Figure 4, in which corresponding elements are designated by corresponding reference numerals chosen from the three hundred series. The indraft turbine 316 is again connected with a branch line 315 of the intake manifold 311 of the engine 310. However, the carburetor is located in this embodiment intermediate the point of connection of branch line 315 with suction line or intake manifold 311 and the vehicle engine 310. An air filter 313 is provided at the free end of intake manifold 311. Two throttling members 318 and 318' are operatively connected in lines 311 and 315 respectively, and are mechanically linked with each other so as to close one while opening the other and vice versa.

The blower 319 is again driven by the turbine 316 and draws in outside air through inlet line 329, and warm-air line sections 321 and 321', while discharging the compressed air through the warm-air delivery line portion 325 and the common mixing line 326, whereby the line 326 leads into the interior of the vehicle body.

A heat exchanger 323 is interposed between lines or conduit sections 321 and 321'. A cold-air branch line 322 connects inlet line 329 directly with mixing line 326. At the junction of warm-air or delivery line portion 325 and by-pass line 322 an adjustable shifting member 331 is provided to controllably regulate the flow of air through line 322 and line 325.

The manner of operation of the embodiment of Figure 5 is the same as that described in connection with the embodiment of Figure 2.

The invention is applicable to carburetor or diesel engines, gasoline injection engines or other combustion engines. Instead of turbines and turbo-blowers, provision may also be made for piston motors and piston blowers or other suitable indraft devices and blowers. Furthermore, the suction device or motor, instead of being inserted ahead of the carburetor, may be connected in parallel with the latter, i. e., an arrangement whereby, for example, the line 15 discharges directly into the suction line 11 between the carburetor 12 and the combustion engine 10.

The term "ventilation" as used herein is understood to include in each case a fresh air system in which the air may be heated or cooled, as desired.

In addition, the individual features of the various embodiments shown herein are not necessarily restricted to the particular embodiments of the heating and ventilation systems but may be optionally exchanged and combined with each other.

The invention is not restricted to the illustrated embodiments but may be varied at will within the scope of the individual concepts of the present invention, as defined by the appended claims.

What I claim is:

1. A heating and ventilating installation with an internal combustion engine, comprising a conduit openly exposed at one end thereof to the atmosphere so that air is forced therethrough due to the dynamic pressure of the moving vehicle, an indraft motor driven by the suction of said internal combustion engine, a warm-air line connected to said conduit, a heat exchanger in said warm-air line, a cold-air branch line by-passing said heat exchanger and connected with said warm-air line on opposite sides of said heat exchanger, a common mixing line connected at the junction of said warm-air line and said branch line which is behind said heat exchanger, valve means located at one of the said junctions of said warm-air line and said branch line for selectively adjusting the amount of air passing through said warm-air line and said cold-air branch line, a blower driven by said motor, and conduit means connecting the output of said blower to said conduit to cause flow of air from said blower over said warm-air line or said branch line into said mixing line dependent on the setting of said valve means.

2. A heating and ventilating installation according to claim 1, comprising further valve means located at the junction of said conduit means and said conduit for selectively controlling the amount of air flowing therethrough into said warm-air and cold-air lines from the output of said blower or from said conduit due to the dynamic pressure produced by the movement of the vehicle.

3. A heating and ventilating installation according to claim 2 wherein said motor is an indraft turbine having an outlet line connected to the main suction line of the engine, and having an inlet line, said outlet line being of considerably larger cross section than said inlet line.

4. A heating and ventilating installation according to claim 3, wherein the cross-section of said outlet line is at least ten times the cross section of said inlet line.

5. A heating and ventilating system according to claim 4, wherein said inlet and outlet lines are of essentially circular cross section, and wherein the ratio of diameters of said inlet line to said outlet line is about 1 to 4.

6. A heating and ventilating installation according to claim 3, wherein the cross section of said main suction line is several times larger than the cross section of said outlet line, and wherein the cross section of said outlet line is several times larger than the cross section of said inlet line.

7. A heating and ventilating installation according to claim 2, further comprising a fresh air line connected to the inlet manifold of said engine, an outlet line from said motor connected to said fresh air line, and valve means located at the junction of said outlet line and said fresh air line to selectively adjust the amount of air fed to said inlet manifold over said outlet line and said fresh air line.

References Cited in the file of this patent

UNITED STATES PATENTS

| | | |
|---|---|---|
| 1,038,402 | McPhee | Sept. 10, 1912 |
| 1,294,438 | Francisco | Feb. 18, 1919 |
| 1,434,916 | Seymour | Nov. 7, 1922 |
| 1,646,861 | Herr | Oct. 25, 1927 |
| 1,751,686 | Duerk | Mar. 25, 1930 |
| 2,081,696 | Cornell | May 25, 1937 |
| 2,118,809 | Cornell | May 31, 1938 |
| 2,147,906 | Lintern | Feb. 21, 1939 |
| 2,257,967 | Le Fevre et al. | Oct. 7, 1941 |
| 2,341,549 | Helmick | Feb. 15, 1944 |
| 2,445,392 | Findley | July 20, 1948 |
| 2,493,122 | Emerich | Jan. 3, 1950 |
| 2,532,486 | Fairbanks et al. | Dec. 5, 1950 |

FOREIGN PATENTS

| | | |
|---|---|---|
| 410,078 | Germany | Apr. 1, 1924 |
| 630,635 | France | Aug. 27, 1927 |
| 995,730 | France | Aug. 22, 1951 |